(12) United States Patent
Sun et al.

(10) Patent No.: US 12,321,395 B2
(45) Date of Patent: Jun. 3, 2025

(54) METHOD FOR DATA ACQUISITION, DEVICE AND STORAGE MEDIUM

(71) Applicant: Beijing Volcano Engine Technology Co., Ltd., Beijing (CN)

(72) Inventors: Yong Sun, Beijing (CN); Dian Chen, Beijing (CN); Yao Zhang, Beijing (CN); Ye Wu, Beijing (CN)

(73) Assignee: Beijing Volcano Engine Technology Co., Ltd., Beijing (CN)

( * ) Notice: Subject to any disclaimer, the term of this patent is extended or adjusted under 35 U.S.C. 154(b) by 0 days.

(21) Appl. No.: 18/798,404

(22) Filed: Aug. 8, 2024

(65) Prior Publication Data

US 2025/0053598 A1 Feb. 13, 2025

(30) Foreign Application Priority Data

Aug. 8, 2023 (CN) .......................... 202310994857.9

(51) Int. Cl.
*G06F 16/9035* (2019.01)
*G06F 16/22* (2019.01)

(52) U.S. Cl.
CPC ...... *G06F 16/9035* (2019.01); *G06F 16/2255* (2019.01)

(58) Field of Classification Search
CPC ............. G06F 16/9035; G06F 16/2255; H04L 63/0227; H04L 63/123; H04L 63/1408; H04L 63/20
See application file for complete search history.

(56) References Cited

U.S. PATENT DOCUMENTS 6,961,728 B2 * 11/2005 Wynblatt ............ G06F 16/2471
9,237,444 B2 * 1/2016 Haddad .................... H04L 63/08
(Continued)

FOREIGN PATENT DOCUMENTS

CN 113051552 A 6/2021
CN 115221551 A 6/2022
(Continued)

OTHER PUBLICATIONS

Notification to Grant Patent Right for Invention with Allowed Claims dated May 22, 2024 in CN Appl. No. 202310994857.9, English translation (10 pages).
(Continued)

*Primary Examiner* — Hosuk Song

(57) ABSTRACT

A method for data acquisition, a device and a storage medium are provided. The method includes: determining a data identification intersection between databases of data providers, where the data identification intersection comprises data identifications that are same between the databases of the data providers; constructing a Bloom vector of a Bloom Filter according to the data identification intersection, and sending the Bloom vector to the data providers; receiving candidate data sent by the data providers, where the candidate data is data corresponding to a target data identification, and the target data identification is determined by the data providers from data identifications of respective databases through the Bloom Filter based on the Bloom vector; and selecting target data corresponding to the data identification intersection from the candidate data.

14 Claims, 5 Drawing Sheets

(56) References Cited

U.S. PATENT DOCUMENTS

| | | | |
|---|---|---|---|
| 10,013,574 B2 * | 7/2018 | Hore | G06F 16/22 |
| 10,708,052 B2 * | 7/2020 | Kominar | H04L 9/3236 |
| 11,119,996 B2 * | 9/2021 | Gold | G06F 16/2237 |
| 11,765,025 B2 * | 9/2023 | Hong | H04L 67/1001 |
| 12,056,123 B2 * | 8/2024 | Cruanes | G06F 16/24556 |
| 2013/0010950 A1 | 1/2013 | Kerschbaum | |
| 2020/0250296 A1 | 8/2020 | Zhao et al. | |

FOREIGN PATENT DOCUMENTS

| | | | |
|---|---|---|---|
| CN | 114884675 | A | 8/2022 |
| CN | 115242371 | A | 10/2022 |
| CN | 116112168 | A | 5/2023 |
| CN | 116361649 | A | 6/2023 |
| CN | 116881521 | A | 10/2023 |
| CN | 116881521 | B | 7/2024 |
| WO | 2020163087 | A1 | 8/2020 |

OTHER PUBLICATIONS

First Office Action dated Mar. 26, 2024 in CN Appl. No. 202310994857.9, English translation (10 pages).

Xiangfu, S., et al., Privacy-Preserving Statistics Protocol for Set-Based Computation, Journal of Computer Research and Development, 57(10): 2221-2231, 2020, English translation of Abstract (11 pages).

Hang En, Jin Ganggang, "Cloud outsourcing multiparty private set intersection protocol based on homomorphic encryption and Bloom filter", Journal of Computer Applications, 2018, 38( 8) : 2256-2260, with English abstract.

International Search Report and Written Opinion mailed Oct. 16, 2024 in PCT Appl. No. PCT/CN2024/109176, English translation (18 pages).

\* cited by examiner

METHOD FOR DATA ACQUISITION, DEVICE AND STORAGE MEDIUM

CROSS-REFERENCE TO RELATED APPLICATION

This application claims the priority to and benefits of the Chinese Patent Application, No. 202310994857.9, which was filed on Aug. 8, 2023, and is hereby incorporated by reference in its entirety.

TECHNICAL FIELD

Embodiments of the present disclosure relate to the technical field of computer and network communication, and in particular to a method for data acquisition, a device and a storage medium.

BACKGROUND

With rapid development of the Internet technology and information services, the data of all walks of life has shown explosive growth, creating opportunities for joint processing of multi-party data, e.g., joint modeling based on multi-party data, federated learning, etc.

In the scenario of joint processing of multi-party data, data of data providers is usually aligned; i.e., the data providers need to provide data corresponding to the same data identification (ID). The data identification intersection between the data providers is usually determined by means of Private Set Intersection (PSI) and then sent to the data providers, and each of the data providers provides the corresponding data based on the data identification in the data identification intersection.

However, the data identification intersection is shared between the data providers, which leads to the data identification intersection being leaked to all the data providers so that privacy protection of the data identification intersection cannot be realized.

SUMMARY

At least one embodiment of the present disclosure provides a method for data acquisition, a device or a storage medium.

At least one embodiment of the present disclosure provides a method for data acquisition, which includes:
  determining a data identification intersection between databases of data providers, where the data identification intersection includes data identifications that are same between the databases of the data providers;
  constructing a Bloom vector of a Bloom Filter according to the data identification intersection, and sending the Bloom vector to the data providers;
  receiving candidate data sent by the data providers, where the candidate data is data corresponding to a target data identification, and the target data identification is determined by the data providers from data identifications of respective databases through the Bloom Filter based on the Bloom vector; and
  selecting target data corresponding to the data identification intersection from the candidate data.

At least one embodiment of the present disclosure provides a method for data acquisition, which includes:
  receiving a Bloom vector of a Bloom Filter sent by a data processing device, where the Bloom vector of the Bloom Filter is a Bloom vector corresponding to a data identification intersection between databases of data providers;
  determining a target data identification from data identifications of a database through the Bloom Filter based on the Bloom vector;
  acquiring data corresponding to the target data identification from the database and determining the data as candidate data; and
  sending the candidate data to the data processing device.

At least one embodiment of the present disclosure provides a device for data acquisition, which includes:
  an intersection determination, configured to determine a data identification intersection between databases of data providers, where the data identification intersection includes data identifications that are same between the databases of the data providers.
  a vector construction unit, configured to construct a Bloom vector of a Bloom Filter according to the data identification intersection.
  a sending unit, configured to send the Bloom vector to the data providers.
  a receiving unit, configured to receive candidate data sent by the data providers, where the candidate data is data corresponding to a target data identification, and the target data identification is determined by the data providers from data identifications of respective databases through the Bloom Filter based on the Bloom vector.
  a data processing unit, configured to select target data corresponding to the data identification intersection from the candidate data.

At least one embodiment of the present disclosure provides a device for data acquisition, which includes:
  a receiving unit, configured to receive a Bloom vector of a Bloom Filter sent by a data processing device, where the Bloom vector of the Bloom Filter is a Bloom vector corresponding to a data identification intersection between databases of data providers.
  a filtering unit, configured to determine a target data identification from data identifications of a database through the Bloom Filter based on the Bloom vector.
  a data acquisition unit, configured to acquire data corresponding to the target data identification from the database and determining the data as candidate data.
  a sending unit, configured to send the candidate data to the data processing device for joint data processing.

At least one embodiment of the present disclosure provides an electronic device, which includes at least one processor and at least one memory,
  where the at least one memory stores computer-executable instructions, and the at least one processor executes the computer-executable instructions stored in the at least one memory, causing the at least one processor to implement the method for data acquisition described above.

At least one embodiment of the present disclosure provides a non-transient computer-readable storage medium, which stores computer-executable instructions, the computer-executable instructions upon being executed by a processor, implementing the method for data acquisition described above.

At least one embodiment of the present disclosure provides a computer program product which includes computer-executable instructions that, when executed by a processor, implement the method for data acquisition described above.

BRIEF DESCRIPTION OF DRAWINGS

To clearly illustrate the technical solution of the embodiments of the present disclosure, the drawings required in the description of the embodiments will be briefly described in the following; it is obvious that the described drawings are only some embodiments of the present disclosure. For those skilled in the art, other drawings can be obtained based on these drawings without any inventive work.

DETAILED DESCRIPTION

Figure 1A:
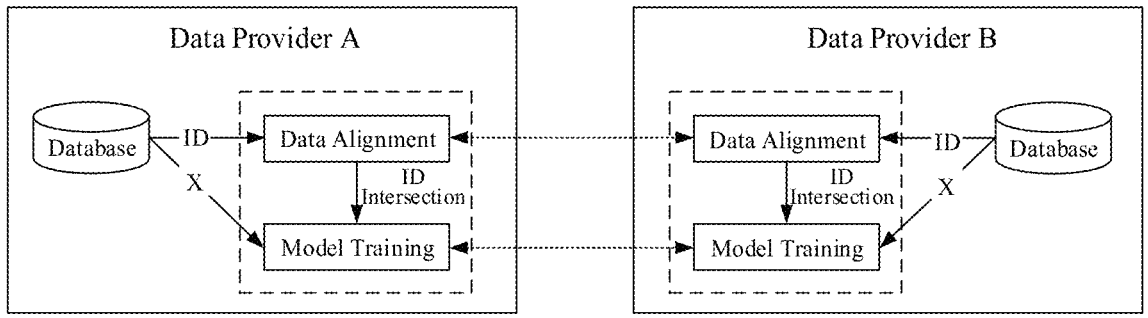
FIG. 1A is an example diagram of a method for data acquisition in the related art.

To make the objects, technical solutions and advantages of the present disclosure clearer, the technical solutions of the embodiments of the present disclosure will be described clearly and fully understandable in conjunction with the drawings related to the embodiments of the present disclosure. Apparently, the described embodiments are just a part but not all the embodiments of the present disclosure. Based on the described embodiments herein, those skilled in the art can obtain other embodiment(s), without any inventive work, which should be within the scope of the present disclosure.

First of all, the terms involved in the present disclosure are explained as follows.

Privacy preserving computing, also known as "privacy computing", refers to a kind of technology for analyzing and calculating data under the premise of providing data privacy protection. Privacy computing is to analyze and calculate the data under the premise of ensuring that the data providers do not disclose the original data in the multi-party scenario, which can guarantee that the data is circulated safely in a "usable but invisible" way. In the scenario of machine learning, it is generally necessary to conduct joint modeling and prediction on the basis of multi-party data, which may be generally divided into multi-party secure computing (MPC), federated learning, the trusted computing environment and so on according to the implementation technology.

Vertical machine learning refers to the scenario of joint modeling in which the data of multiple parties or two parties has the same sample space but different feature spaces. The data of the multiple parties or two parties modeled in this scenario needs to be aligned firstly according to the data identifications (IDs).

The Bloom Filter was proposed by Bloom in 1970. It consists of a binary vector and a series of random mapping (Hash) functions. The Bloom Filter can be used to retrieve whether an element is in a set. It has an advantage of efficient query, but has a disadvantage of a misidentification rate (i.e., the data that is not in a set is mistakenly identified as being in the set, but the data that is in the set is identified as being not in the set) which is adjustable (by controlling the size of the binary vector space).

The trusted execution environment (TEE) is a hardware-based security mechanism that loads the code and data involved in calculation into a trusted environment protected by the CPU so as to provide protection in confidentiality and integrity. The TEE provides a higher level of security than the operating system, and thus is suitable for processing sensitive data therein.

In the scenario of joint processing of multi-party data, the data of data providers is usually aligned; i.e., the data providers need to provide data corresponding to the same data identification (ID). The data of the data providers is aligned, the data identification intersection between the data providers is usually determined by means of Private Set Intersection (PSI) and then sent to the data providers, and each of the data providers provides the corresponding data X based on the data identification in the data identification intersection.

As shown in FIG. 1A, taking two parties as an example, in the scenario of joint processing, especially vertical joint modeling, of multi-party data, when modeling is conducted through multi-party secure computing and federated learning, the data of the data providers is aligned to obtain a data identification (ID) intersection between the data providers, and then each of the data providers provides the corresponding data X (e.g., feature data) based on the data identification in the data identification intersection for model training.

Figure 1B:
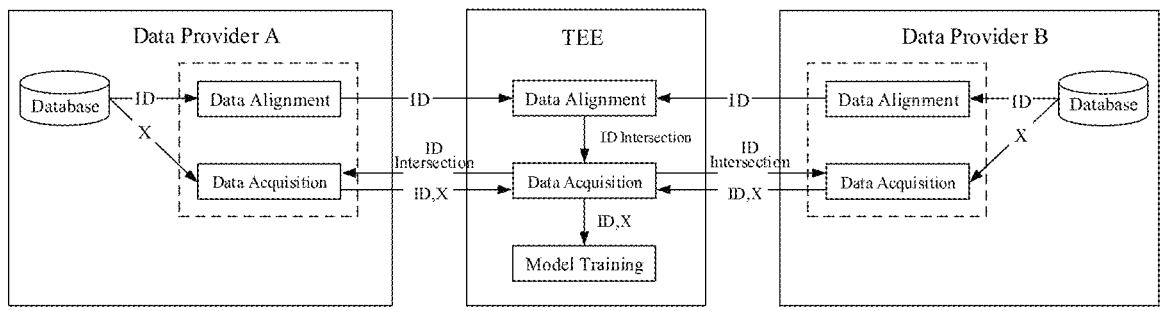
FIG. 1B is an example diagram of another method for data acquisition in the related art.

In another related art, in the trusted execution environment (TEE), if the data providers have a large amount of data which cannot be loaded into the TEE all at once, or if it is not allowed to load all the data into the TEE based on the requirement for data privacy protection, then as shown in FIG. 1B, all the IDs of the two parties involved are firstly loaded into the TEE in which the data is aligned, and then each of the data providers loads the data X (e.g., feature data) corresponding to the data identification (ID) intersection into the TEE for subsequent model training.

However, the data identification intersection is shared between the data providers, leading to the data identification intersection being leaked to both of the data providers so that either of the data providers can know some of the data identifications of the other data provider. If one of the data providers has relatively overall data identifications, then the data provider may know all the data identifications of the other data provider based on the data identification intersection. As a result, privacy protection for the data identification intersection cannot be realized.

In order to solve the above technical problems, the present disclosure provides a method for data acquisition. After the data identification intersection between the databases of the data providers is acquired, the data identifications can be retrieved by the data providers based on the Bloom Filter. Moreover, in view of the misidentification rate of the Bloom Filter, confusion is added to the target data identification retrieved by the data providers due to the characteristic of the Bloom Filter having the misidentification rate. This reduces the probability for the data providers to reversely deduce the original data identification intersection so that the data providers cannot acquire the original data identification intersection, thereby protecting the data identification intersection from being leaked and improving the data security.

Further, the misidentification rate of the Bloom Filter can be made large enough by adjusting the Bloom vector length, thereby further reducing the probability for the data providers to reversely deduce the original data identification intersection.

Figure 2:
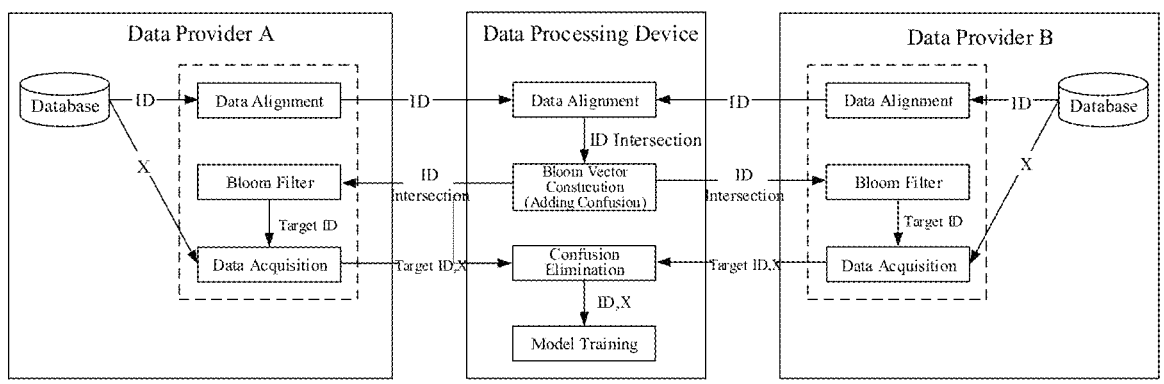
FIG. 2 is a schematic diagram of an application scenario of a method for data acquisition provided in an embodiment of the present disclosure.

The application scenario of the method for data acquisition provided in the present disclosure is shown in FIG. 2. A data processing device determines a data identification (ID) intersection between databases of data providers (e.g., two or more data providers) through data alignment. The data identification intersection includes the same data identifications between the databases of the data providers. The data processing device constructs a Bloom vector of the Bloom Filter according to the data identification intersection, and sends the Bloom vector to the data providers. The data processing device receives candidate data sent by the data providers, the candidate data is data corresponding to a target data identification (target ID), and the target data identification is determined by the data providers from data identifications of their respective databases through the Bloom Filter based on the Bloom vector. The data processing device selects target data corresponding to the data identification intersection from the candidate data. The data processing device may be a data processing device in the TEE.

It should be noted that, the user information and data involved in the present disclosure are all information and data authorized by the user or fully authorized by the parties; and collection, use and processing of relevant data should comply with relevant laws, regulations and standards of relevant countries and regions, and there is provided a corresponding operation entrance through which the user can choose for authorizing or rejecting.

Hereinbelow, the method for data acquisition of the present disclosure is introduced in detail in combination with specific embodiments.

Figure 3:
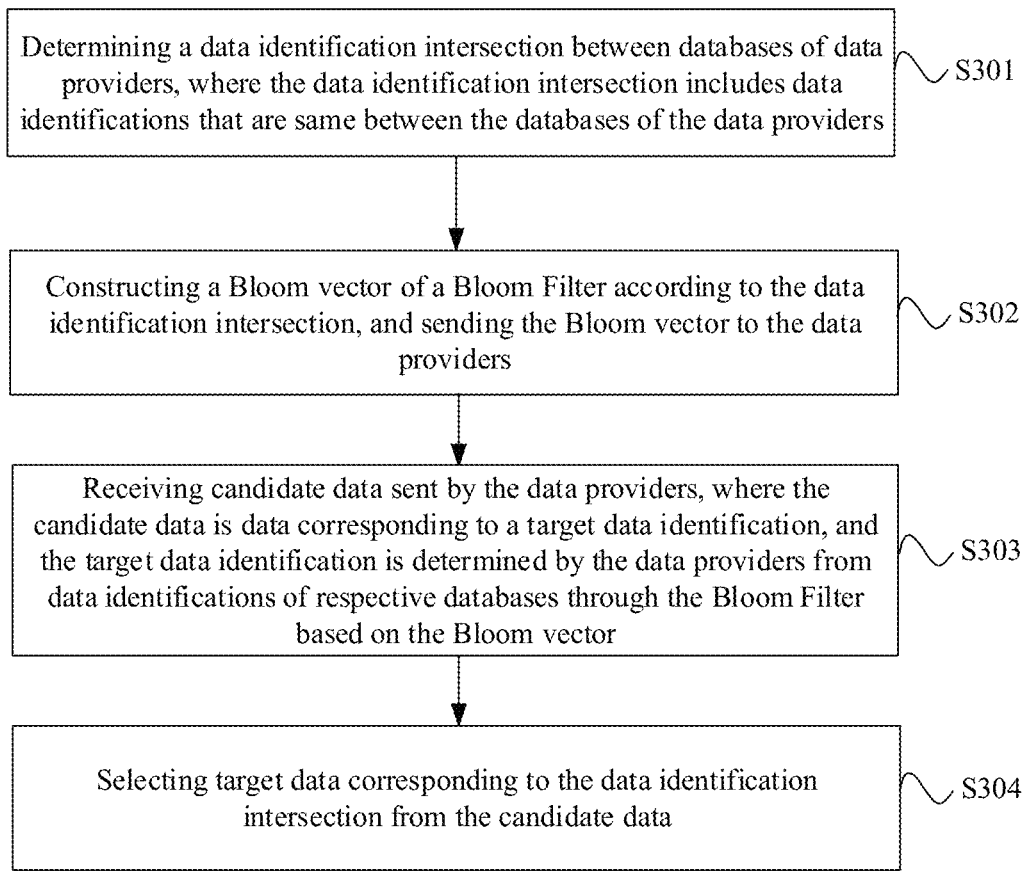
FIG. 3 is a flowchart of a method for data acquisition provided in an embodiment of the present disclosure.

Referring to FIG. 3, FIG. 3 is a flowchart of a method for data acquisition provided in an embodiment of the present disclosure. The method in this embodiment can be applied in a data processing device. The method for data acquisition includes the following steps:

S301: determining a data identification intersection between databases of data providers, where the data identification intersection includes data identifications that are same between the databases of the data providers.

In this embodiment, in the application scenario of joint processing of multi-party data (e.g., joint modeling and predication based on the multi-party data), the multi-party data needs to be aligned firstly according to data identifications (IDs) on the premise that the data providers do not disclose the original data in the multi-party scenario. In this embodiment, the same data identifications (IDs) between the databases of the data providers may be firstly determined to obtain the data identification intersection between the databases of the data providers. The data identification intersection between the databases of the data providers may be acquired in any possible way, e.g., by means of Private Set Intersection (PSI) or by loading data identifications of the data providers into the trusted execution environment (TEE) to calculate the intersection, which is not limited here.

S302: constructing a Bloom vector of a Bloom Filter according to the data identification intersection, and sending the Bloom vector to the data providers.

In this embodiment, after the data identification intersection between the databases of the data providers is acquired, it is needed for the data providers to retrieve the data identifications in their respective databases that fall into the data identification intersection. Because the Bloom Filter can be used to retrieve whether an element is in a set, the Bloom Filter is applied to implement retrieval of the data identifications in this embodiment. It is feasible to construct the Bloom vector (also referred to as a bit vector, i.e., a bit array consisting of 0 and 1) of the Bloom Filter according to the data identification intersection and send the Bloom vector to the data providers without the need of directly sending the data identification intersection to the data providers.

The process of constructing the Bloom vector of the Bloom Filter according to the data identification intersection may be as follows. Firstly, a Bloom vector (a bit vector, which may start with all 0) with a preset length is constructed, and Hash calculation is performed on the data identifications in the data identification intersection according to a preset Hash function. If a Hash calculation result of a data identification corresponds to a position in the Bloom vector (e.g., when a Hash calculation result of a data identification is 2, it corresponds to the second position in the Bloom vector), then the value of this position in the Bloom vector is set to 1.

S303: receiving candidate data sent by the data providers, where the candidate data is data corresponding to a target data identification, and the target data identification is determined by the data providers from data identifications of respective databases through the Bloom Filter based on the Bloom vector.

In this embodiment, for each of the data providers, after receiving the Bloom vector of the Bloom Filter sent by the data processing device, the data provider determine the target data identification from data identifications of its own database through the Bloom Filter based on the Bloom vector, i.e., implement filtering of the data identifications through the Bloom Filter. The hit data identification is denoted as the target data identification. The data provider acquire the data corresponding to the target data identification from its own database, determine the data as the candidate data and send the candidate data to the data processing device.

The specific process for the Bloom Filter to filter the data identifications may be as follows. Hash calculation is performed on any of the data identifications of the database according to the preset Hash function, a value of a position corresponding to the Hash calculation result is queried from the Bloom vector according to the Hash calculation result, and whether the data identification is the target data identification is determined according to the value. If the value is 1, then it is determined that the data identification is the target data identification; and if the value is 0, then it is determined that the data identification is not the target data identification.

In this embodiment, the Bloom Filter has a certain misidentification rate. Specifically, in fact, as for the Bloom Filter, an element is mapped to a position in the Bloom vector through the Hash function, and whether the element is in the set can be known by determining whether the value of this position is 1. However, a conflict will occur during the Hash calculation if there are a plurality of elements; i.e., the plurality of elements may be mapped to the same position in the Bloom vector. As a result, the Bloom Filter has the following characteristics: if a position in the Bloom vector is 0, then the element mapped to the position is certainly not in the set; if a position in the Bloom vector is 1, then the element mapped to the position is not necessarily in the set; therefore, the Bloom Filter has a certain misidentification rate; and moreover, the smaller the Bloom vector length, the greater the probability of the Hash conflict and the greater the misidentification rate of the Bloom Filter. In this embodiment, by means of the characteristic of the Bloom Filter having the misidentification rate, when any of the data providers filters the data identifications based on the Bloom Filter, it can filter out not only the data identifications belonging to the data identification intersection, but also some data identifications that do not belong to the data identification intersection. That is, the above target data identification includes the data identifications of the data identification intersection and is greater than the data identification intersection, which is equivalent to the fact that confusing data identifications are added to the data identification intersection. Thereby, the probability for the data providers to reversely deduce the original data identification intersection is reduced so that the data identification intersection is protected.

S304: selecting target data corresponding to the data identification intersection from the candidate data.

In this embodiment, after the candidate data sent by the data providers is acquired, because the candidate data includes not only the data corresponding to the data identifications belonging to the data identification intersection but also the data corresponding to the data identifications that do not belong to the data identification intersection, the data corresponding to the data identifications belonging to the data identification intersection (i.e., the aforesaid target data corresponding to the data identification intersection) can be selected from the candidate data based on the data identification intersection.

Further, after the target data corresponding to the data identification intersection is selected from the candidate data, it is feasible to fuse target data corresponding to the same data identification and conduct data processing based on the fused target data (e.g., modeling based on the fused target data) for joint modeling of multiple parties.

The method for data acquisition provided in this embodiment includes: determining a data identification intersection between databases of data providers, where the data identification intersection includes data identifications that are same between the databases of the data providers; constructing a Bloom vector of a Bloom Filter according to the data identification intersection, and sending the Bloom vector to the data providers; receiving candidate data sent by the data providers, where the candidate data is data corresponding to a target data identification, and the target data identification is determined by the data providers from data identifications of respective databases through the Bloom Filter based on the Bloom vector; and selecting target data corresponding to the data identification intersection from the candidate data. In this embodiment, the data identifications are retrieved by the data providers through the Bloom Filter based on the data identification intersection between the databases of the data providers; and by means of the characteristic of the Bloom Filter having the misidentification rate, confusion is added to the target data identification retrieved by the data providers so as to reduce the probability for the data providers to reversely deduce the original data identification intersection so that the data providers cannot acquire the original data identification intersection, thereby protecting the data identification intersection from being leaked and improving the data security.

In any of the above embodiments, constructing a Bloom vector of a Bloom Filter according to the data identification intersection in S302 may specifically include:

performing Hash calculation on the data identifications in the data identification intersection according to a preset Hash function, and constructing the Bloom vector based on a Hash calculation result and a preset Bloom vector length.

In this embodiment, when the Bloom vector is constructed for the data identification intersection, it is feasible to perform Hash calculation on the data identifications in the data identification intersection according to the preset Hash function and then construct the Bloom vector according to the Hash calculation result. In this embodiment, the Bloom Filter has the misidentification rate, and the smaller the Bloom vector length, the greater the misidentification rate of the Bloom Filter. Therefore, when the Bloom vector is constructed, a preset Bloom vector length can be set in advance to control the magnitude of the misidentification rate of the Bloom Filter and thus control the degree of confusion added to the data identification intersection.

Specifically, an initial Bloom vector (a bit vector, which may start with all 0) can be constructed based on the preset Bloom vector length, and Hash calculation can be performed on the data identifications in the data identification intersection according to the preset Hash function. If a Hash calculation result of a data identification corresponds to a position in the Bloom vector (e.g., when a Hash calculation result of a data identification is 2, it corresponds to the second position in the Bloom vector), then the value of this position in the Bloom vector is set to 1, and finally the Bloom vector with the preset Bloom vector length is obtained.

Alternatively, the preset Bloom vector length is a preset multiple of the total number of the data identifications in the data identification intersection, which is less than 1. That is, the preset Bloom vector length is smaller than the total number of the data identifications in the data identification intersection. Under the ideal condition that the Bloom Filter had no misidentification rate, each of the data identifications in the data identification intersection would correspond to a position in the Bloom vector, i.e., the Bloom vector length would be equal to or greater than the total number of the data identifications in the data identification intersection. Conversely, if the preset Bloom vector length is smaller than the total number of the data identifications in the data identification intersection, then the Bloom Filter is bound to have a misidentification rate. Moreover, the smaller the preset Bloom vector length than the total number of the data identifications in the data identification intersection, the greater the misidentification rate of the Bloom Filter; i.e., the smaller the aforesaid preset multiple, the greater the misidentification rate of the Bloom Filter.

In another alternative embodiment, before constructing the Bloom vector based on the Hash calculation result and the preset Bloom vector length, the method may further include:

determining a total number of the data identifications in the data identification intersection; and determining the preset Bloom vector length based on the total number of the data identifications and an adjustment factor for a misidentification rate of the Bloom Filter.

In this embodiment, it is feasible to determine the total number of the data identifications in the data identification intersection based on the data identification intersection and determine the preset Bloom vector length on the basis of the total number of the data identifications and in combination with the adjustment factor for the misidentification rate (also referred to as the adjustment factor for confusion) of the Bloom Filter.

Specifically, the total number of the data identifications in the data identification intersection may firstly be determined as an initial Bloom vector length, and the Bloom Filter has a small misidentification rate or no misidentification rate at this time. The initial Bloom vector length is reduced based on the adjustment factor to obtain the preset Bloom vector length. For example, if the adjustment factor for the misidentification rate of the Bloom Filter is 2 times, then it indicates that the misidentification rate of the Bloom Filter needs to be increased by 2 times or that the confusion needs to be increased by 2 times. At this time, the initial Bloom vector length can be reduced by 2 times; i.e., the preset Bloom vector length obtained at this time is ½ of the total number of the data identifications in the data identification intersection.

In any of the above embodiments, the method for data acquisition of this embodiment can be executed in the trusted execution environment (TEE); i.e., the aforesaid data processing device is a data processing device in the TEE. As shown in FIG. 2, in the TEE, the data processing device acting as a neutral third party determines a data identification intersection between databases of data providers, constructs a Bloom vector of the Bloom Filter according to the data identification intersection and sends the Bloom vector to the data providers, receives candidate data sent by the data providers, and selects target data corresponding to the data identification intersection from the candidate data. Further, the data processing device can further conduct model training based on the target data corresponding to the data identification intersection, which can protect the data from being leaked and improve the data security.

Figure 4:
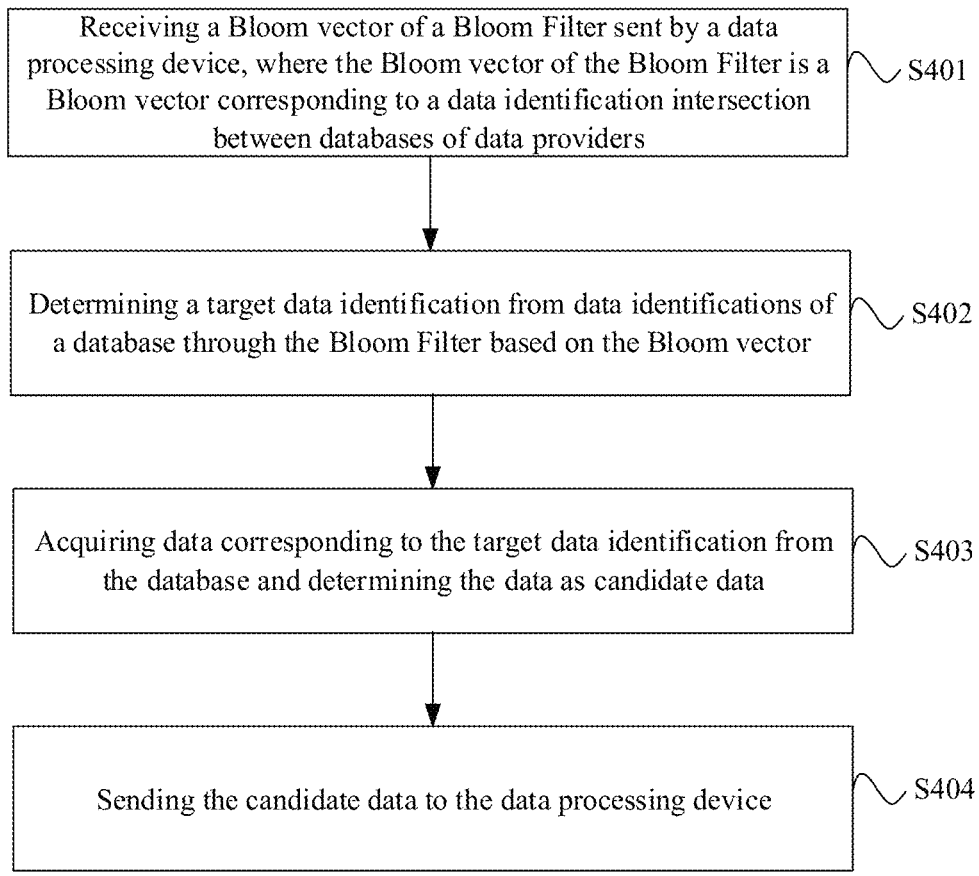
FIG. 4 is a flowchart of a method for data acquisition provided in another embodiment of the present disclosure.

Referring to FIG. 4, FIG. 4 is a flowchart of a method for data acquisition provided in an embodiment of the present disclosure. The method of this embodiment may be applied in a device of a data provider. The method for data acquisition includes the following steps:

S401: receiving a Bloom vector of a Bloom Filter sent by a data processing device, where the Bloom vector of the Bloom Filter is a Bloom vector corresponding to a data identification intersection between databases of data providers;

S402: determining a target data identification from data identifications of a database through the Bloom Filter based on the Bloom vector;

S403: acquiring data corresponding to the target data identification from the database and determining the data as candidate data; and S404: sending the candidate data to the data processing device.

Further, determining the target data identification from data identifications of the database through the Bloom Filter based on the Bloom vector includes:

performing Hash calculation on a first data identification of the data identifications of the database according to a preset Hash function, querying a value of a position corresponding to a Hash calculation result from the Bloom vector according to the Hash calculation result, and determining whether the data identification is the target data identification according to the value.

The first data identification is any of the data identifications of the database.

This embodiment is the method for the side of the data provider in the above embodiment, and the principle and technical effect of the method can be found in the above embodiments and will not be further described herein.

Figure 5:
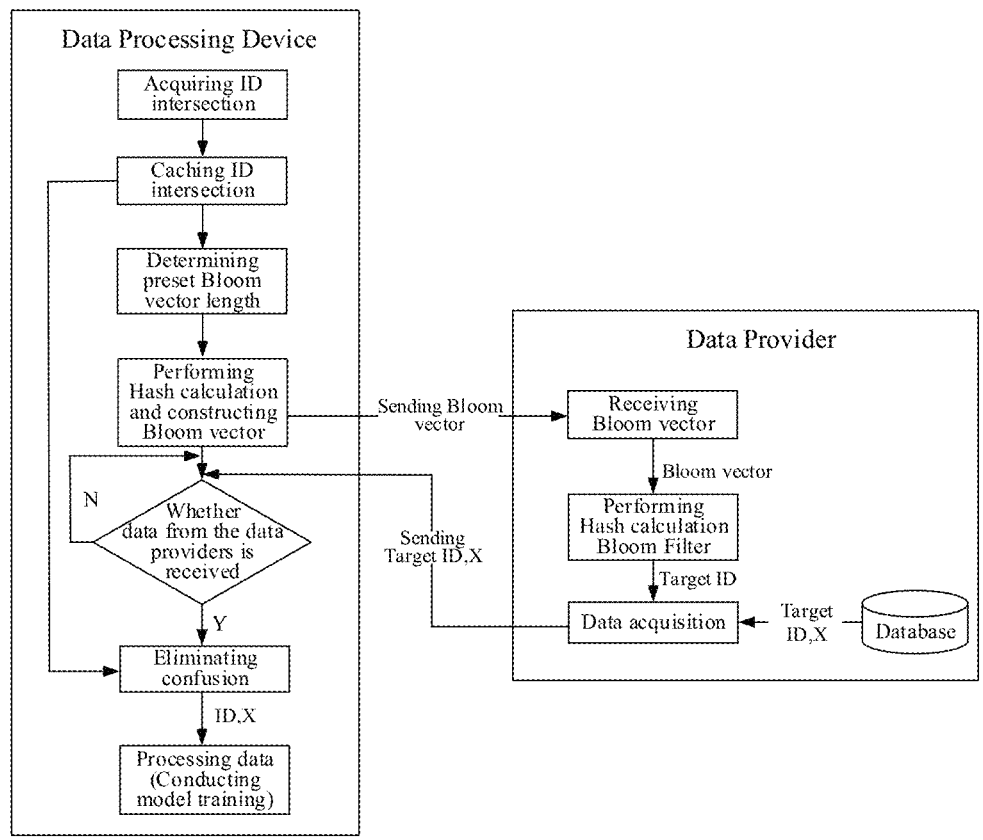
FIG. 5 is a flowchart of a method for data acquisition provided in another embodiment of the present disclosure.

Referring to FIG. 5, FIG. 5 is a flowchart of a method for data acquisition provided in this embodiment. The method for data acquisition includes the following steps:

1) acquiring a data identification (ID) intersection by a data processing device;
2) caching the data identification (ID) intersection by the data processing device;
3) determining a preset Bloom vector length by the data processing device;
4) performing Hash calculation on data identifications in the data identification intersection according to a preset Hash function and constructing a Bloom vector based on a Hash calculation result and the preset Bloom vector length by the data processing device;
5) sending the Bloom vector to data providers by the data processing device;
6) receiving the Bloom vector by the data providers;
7) performing Hash calculation on any of the data identifications of the databases according to the preset Hash function and determining a target data identification through the Bloom Filter based on the Bloom vector by the data providers;
8) acquiring data (X) corresponding to the target data identification from the databases and determining the data (X) as candidate data by the data providers;
9) sending the candidate data to the data processing device by the data providers;
10) determining by the data processing device whether the data from the data providers is received, where if it is determined that the data is received, then the following steps continue; or if the data is not received, then the data processing device waits;
11) selecting target data corresponding to the data identification (ID) intersection from the candidate data for eliminating confusion; and
12) processing the data, e.g., fusing the target data corresponding to the same data identification and conducting model training based on the fused target data.

Figure 6:
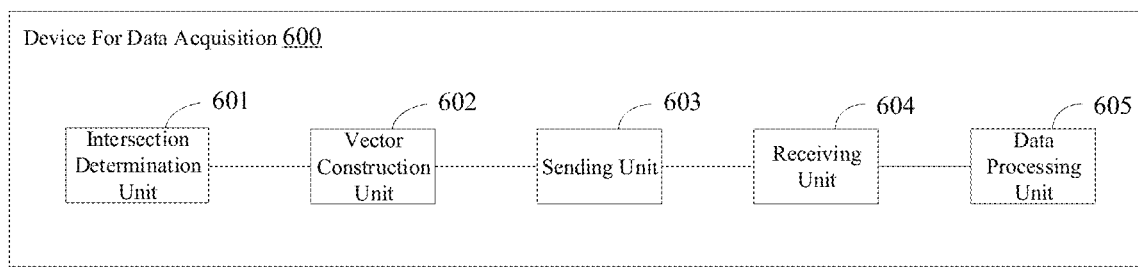
FIG. 6 is a structure diagram of a device for data acquisition provided in an embodiment of the present disclosure.

Corresponding to the method for data acquisition for the side of the data processing device in the above embodiments, FIG. 6 is a structure diagram of a device for data acquisition provided in an embodiment of the present disclosure. For case of illustration, only the parts related to the embodiment of the present disclosure are shown. Referring to FIG. 6, the device for data acquisition 600 includes: an intersection determination unit 601, a vector construction unit 602, a sending unit 603, a receiving unit 604 and a data processing unit 605.

The intersection determination 601 is configured to determine a data identification intersection between databases of data providers, where the data identification intersection includes data identifications that are same between the databases of the data providers.

The vector construction unit 602 is configured to construct a Bloom vector of a Bloom Filter according to the data identification intersection.

The sending unit 603 is configured to send the Bloom vector to the data providers.

The receiving unit 604 is configured to receive candidate data sent by the data providers, where the candidate data is data corresponding to a target data identification, and the target data identification is determined by the data providers from data identifications of respective databases through the Bloom Filter based on the Bloom vector.

The data processing unit 605 is configured to select target data corresponding to the data identification intersection from the candidate data.

In one or more embodiments of the present disclosure, when constructing the Bloom vector of the Bloom Filter according to the data identification intersection, the vector construction unit 602 is configured to:

perform Hash calculation on the data identifications in the data identification intersection according to a preset Hash function, and construct the Bloom vector based on a Hash calculation result and a preset Bloom vector length.

In one or more embodiments of the present disclosure, the preset Bloom vector length is a preset multiple of a total number of the data identifications in the data identification intersection, and the preset multiple is less than 1.

In one or more embodiments of the present disclosure, before constructing the Bloom vector based on the Hash calculation result and the preset Bloom vector length, the vector construction unit 602 is further configured to:

determine a total number of the data identifications in the data identification intersection; and determine the preset Bloom vector length based on the total number of the data identifications and an adjustment factor for a misidentification rate of the Bloom Filter.

In one or more embodiments of the present disclosure, when determining the preset Bloom vector length based on the total number of the data identifications and the adjustment factor for the misidentification rate of the Bloom Filter, the vector construction unit 602 is configured to:

determine the total number of the data identifications as an initial Bloom vector length; and reduce the initial Bloom vector length based on the adjustment factor to obtain the preset Bloom vector length.

In one or more embodiments of the present disclosure, after selecting target data corresponding to the data identification intersection from the candidate data, the data processing unit 605 is further configured to:

fuse target data corresponding to the same data identification and conduct data processing based on the fused target data.

In one or more embodiments of the present disclosure, the method is applied to a data processing device in the trusted execution environment (TEE).

The device for data acquisition provided in this embodiment can be used to implement the technical solution of the method embodiment for the side of the data processing device described above, and has the similar implementation principle and technical effect, which will not be further described here in this embodiment.

Figure 7:
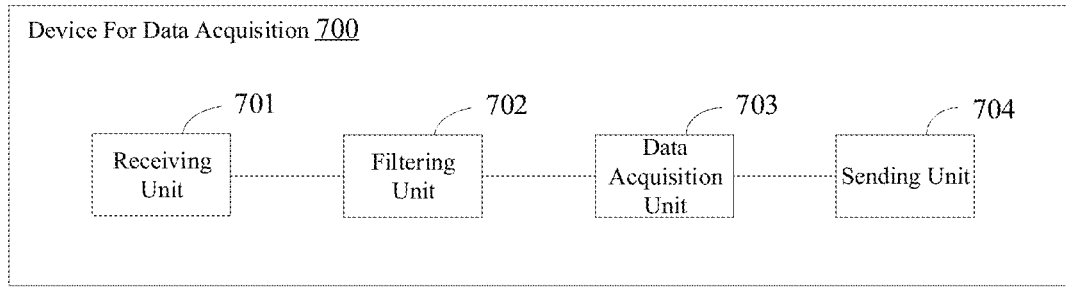
FIG. 7 is a structure diagram of a device for data acquisition provided in another embodiment of the present disclosure.

Corresponding to the method for data acquisition for the side of the data providers in the above embodiments, FIG. 7 is a structure diagram of a device for data acquisition provided in an embodiment of the present disclosure. For ease of illustration, only the parts related to the embodiment of the present disclosure are shown. Referring to FIG. 7, the device for data acquisition 700 includes: a receiving unit 701, a filtering unit 702, a data acquisition unit 703 and a sending unit 704.

The receiving unit 701 is configured to receive a Bloom vector of a Bloom Filter sent by a data processing device, where the Bloom vector of the Bloom Filter is a Bloom vector corresponding to a data identification intersection between databases of data providers.

The filtering unit 702 is configured to determine a target data identification from data identifications of a database through the Bloom Filter based on the Bloom vector.

The data acquisition unit 703 is configured to acquire data corresponding to the target data identification from the database and determining the data as candidate data.

The sending unit 704 is configured to send the candidate data to the data processing device for joint data processing.

In one or more embodiments of the present disclosure, when determining a target data identification from data identifications of the database through the Bloom Filter based on the Bloom vector, the filtering unit 702 is configured to:

perform Hash calculation on a first data identification among the data identifications of the database according to a preset Hash function, query a value of a position corresponding to a Hash calculation result from the Bloom vector according to the Hash calculation result, and determine whether the first data identification is the target data identification according to the value.

The device for data acquisition provided in this embodiment can be used to implement the technical solution of the method embodiment for the side of the data provider described above, and has the similar implementation principle and technical effect, which will not be further described here in this embodiment.

Figure 8:
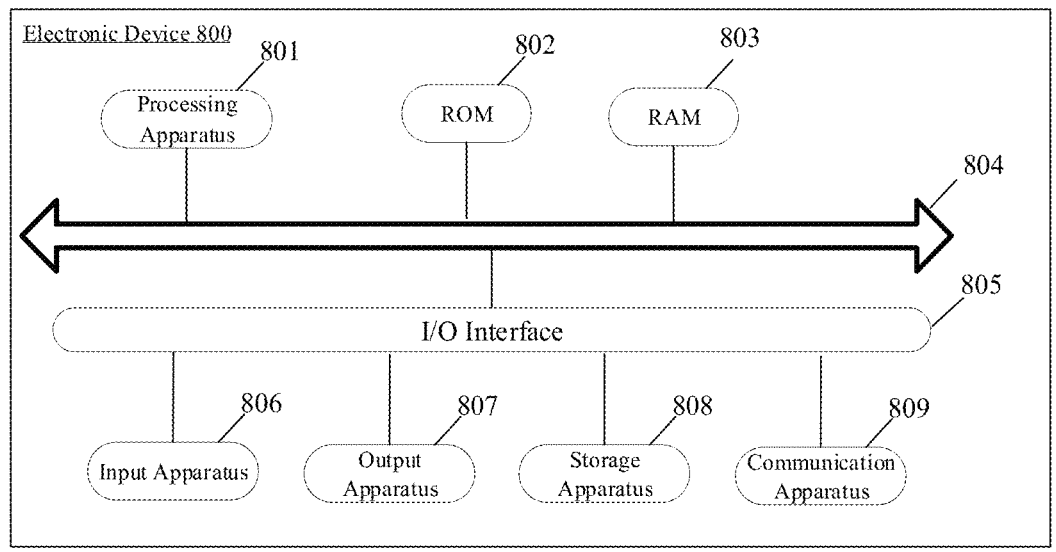
FIG. 8 is a schematic diagram of a hardware structure of an electronic device provided in an embodiment of the present disclosure.

Referring to FIG. 8, which shows a structural schematic diagram suitable for achieving the electronic device 800 in the embodiment of the present disclosure. The electronic device 800 may be a terminal device or a server. The terminal device may include but not be limited to a mobile terminal such as a mobile phone, a notebook computer, a digital broadcasting receiver, a personal digital assistant (PDA), a portable android device (PAD), a portable multimedia player (PMP), a vehicle terminal (such as a vehicle navigation terminal), and a fixed terminal such as a digital television (TV) and a desktop computer. The electronic device shown in FIG. 8 is only an example and should not impose any limitations on the functions and use scopes of the embodiments of the present disclosure.

As shown in FIG. 8, the electronic device 800 may include a processing apparatus (such as a central processing unit, and a graphics processor) 801, it may execute a plurality appropriate actions and processes according to a program stored in a read-only memory (ROM) 802 or a program loaded from a storage apparatus 808 to a random-access memory (RAM) 803. In RAM 803, a plurality of programs and data required for operations of the electronic device 800 are also stored. The processing apparatus 801, ROM 802, and RAM 803 are connected to each other by a bus 804. An input/output (I/O) interface 805 is also connected to the bus 804.

Generally, the following apparatuses may be connected to the I/O interface 805: an input apparatus 806 such as a touch screen, a touchpad, a keyboard, a mouse, a camera, a microphone, an accelerometer, and a gyroscope; an output apparatus 807 such as a liquid crystal display (LCD), a loudspeaker, and a vibrator; a storage apparatus 808 such as a magnetic tape, and a hard disk drive; and a communication apparatus 809. The communication apparatus 809 may allow the electronic device 800 to wireless-communicate or wire-communicate with other devices to exchange data. Although FIG. 8 shows the electronic device 800 with a plurality of apparatuses, it is not required to implement or possess all the apparatuses shown. Alternatively, it may implement or possess the more or less apparatuses.

In particular, according to an embodiment of the present disclosure, the process described above with reference to the flowchart may be achieved as a computer software program.

For example, an embodiment of the present disclosure includes a computer program product, it includes a computer program carried on a computer-readable medium, and the computer program includes program codes for executing the method shown in the flowchart. In such an embodiment, the computer program may be downloaded and installed from the network by the communication apparatus 809, or installed from the storage apparatus 808, or installed from ROM 802. When the computer program is executed by the processing apparatus 801, the above functions defined in the data acquisition method on the data processing apparatus side or the data acquisition method on the data provider side in the embodiments of the present disclosure are executed.

It should be noted that the above computer-readable medium in the present disclosure may be a computer-readable signal medium, a computer-readable storage medium, or any combinations of the two. The computer-readable storage medium may be, for example, but not limited to, a system, an apparatus or a device of electricity, magnetism, light, electromagnetism, infrared, or semiconductor, or any combinations of the above. More examples of the computer-readable storage medium may include but not be limited to: an electric connector with one or more wires, a portable computer magnetic disk, a hard disk drive, a RAM, a ROM, an erasable programmable read-only memory (EPROM or flash memory), an optical fiber, a compact disk read-only memory (CD-ROM), an optical storage device, a magnetic storage device or any suitable combinations of the above. In the present disclosure, the computer-readable storage medium may be any visible medium that contains or stores a program, and the program may be used by an instruction executive system, apparatus or device or used in combination with it. In the present disclosure, the computer-readable signal medium may include a data signal propagated in a baseband or as a part of a carrier wave, it carries the computer-readable program code. The data signal propagated in this way may adopt a plurality of forms, including but not limited to an electromagnetic signal, an optical signal, or any suitable combinations of the above. The computer-readable signal medium may also be any computer-readable medium other than the computer-readable storage medium, and the computer-readable signal medium may send, propagate, or transmit the program used by the instruction executive system, apparatus or device or in combination with it. The program code contained on the computer-readable medium may be transmitted by using any suitable medium, including but not limited to: a wire, an optical cable, a radio frequency (RF) or the like, or any suitable combinations of the above.

The above-mentioned computer-readable medium may be included in the electronic device described above, or may exist alone without being assembled into the electronic device.

The above-mentioned computer-readable medium carries one or more programs which, when executed by the electronic device, cause the electronic device to perform the method in the above-mentioned embodiments.

The computer program code for executing the operation of the present disclosure may be written in one or more programming languages or combinations thereof, the above programming language includes but is not limited to object-oriented programming languages such as Java, Smalltalk, and C++, and further includes conventional procedural programming languages such as a "C" language or a similar programming language. The program code may be completely executed on the user's computer, partially executed on the user's computer, executed as a standalone software package, partially executed on the user's computer and partially executed on a remote computer, or completely executed on the remote computer or server. In the case involving the remote computer, the remote computer may be connected to the user's computer by any types of networks, including local area network (LAN) or wide area network (WAN), or may be connected to an external computer (such as connected by using an internet service provider through the Internet).

The flowcharts and the block diagrams in the drawings show possibly achieved system architectures, functions, and operations of systems, methods, and computer program products according to a plurality of embodiments of the present disclosure. At this point, each box in the flowchart or the block diagram may represent a module, a program segment, or a part of a code, the module, the program segment, or a part of the code contains one or more executable instructions for achieving the specified logical functions. It should also be noted that in some alternative implementations, the function indicated in the box may also occur in a different order from those indicated in the drawings. For example, two consecutively represented boxes may actually be executed basically in parallel, and sometimes it may also be executed in an opposite order, this depends on the function involved. It should also be noted that each box in the block diagram and/or the flowchart, as well as combinations of the boxes in the block diagram and/or the flowchart, may be achieved by using a dedicated hardware-based system that performs the specified function or operation, or may be achieved by using combinations of dedicated hardware and computer instructions.

The units described in the embodiments of the present disclosure may be implemented by means of software or by means of hardware. The name of the unit does not constitute a limitation for the unit itself in a case.

The functions described above in this article may be at least partially executed by one or more hardware logic components. For example, non-limiting exemplary types of the hardware logic component that may be used include: a field programmable gate array (FPGA), an application specific integrated circuit (ASIC), an application specific standard part (ASSP), a system on chip (SOC), a complex programmable logic device (CPLD) and the like.

In the context of the present disclosure, the machine-readable medium may be a visible medium, and it may contain or store a program for use by or in combination with an instruction executive system, apparatus, or device. The machine-readable medium may be a machine-readable signal medium or a machine-readable storage medium. The machine-readable medium may include but not limited to an electronic, magnetic, optical, electromagnetic, infrared, or semiconductor system, apparatus, or device, or any suitable combinations of the above. More specific examples of the machine-readable storage medium may include an electric connector based on one or more wires, a portable computer disk, a hard disk drive, RAM, ROM, EPROM (or a flash memory), an optical fiber, CD-ROM, an optical storage device, a magnetic storage device, or any suitable combinations of the above.

One or more embodiments of the present disclosure provide a method for data acquisition, which includes:
    determining a data identification intersection between databases of data providers, where the data identification intersection includes data identifications that are same between the databases of the data providers;

constructing a Bloom vector of a Bloom Filter according to the data identification intersection, and sending the Bloom vector to the data providers;

receiving candidate data sent by the data providers, where the candidate data is data corresponding to a target data identification, and the target data identification is determined by the data providers from data identifications of respective databases through the Bloom Filter based on the Bloom vector; and selecting target data corresponding to the data identification intersection from the candidate data.

According to one or more embodiments of the present disclosure, the constructing a Bloom vector of a Bloom Filter according to the data identification intersection includes:

performing Hash calculation on the data identifications in the data identification intersection according to a preset Hash function, and constructing the Bloom vector based on a Hash calculation result and a preset Bloom vector length.

According to one or more embodiments of the present disclosure, where the preset Bloom vector length is a preset multiple of a total number of the data identifications in the data identification intersection, and the preset multiple is less than 1.

According to one or more embodiments of the present disclosure, before the constructing the Bloom vector based on a Hash calculation result and a preset Bloom vector length, the method further includes:

determining a total number of the data identifications in the data identification intersection; and determining the preset Bloom vector length based on the total number of the data identifications and an adjustment factor for a misidentification rate of the Bloom Filter.

According to one or more embodiments of the present disclosure, the determining the preset Bloom vector length based on the total number of the data identifications and an adjustment factor for a misidentification rate of the Bloom Filter includes:

determining the total number of the data identifications as an initial Bloom vector length; and reducing the initial Bloom vector length based on the adjustment factor to obtain the preset Bloom vector length.

According to one or more embodiments of the present disclosure, after selecting target data corresponding to the data identification intersection from the candidate data, the method further includes:

fusing target data corresponding to a same data identification and conducting data processing based on fused target data.

According to one or more embodiments of the present disclosure, the method is applied to a data processing device in a trusted execution environment.

One or more embodiments of the present disclosure provide a method for data acquisition, which includes:

receiving a Bloom vector of a Bloom Filter sent by a data processing device, where the Bloom vector of the Bloom Filter is a Bloom vector corresponding to a data identification intersection between databases of data providers;

determining a target data identification from data identifications of a database through the Bloom Filter based on the Bloom vector;

acquiring data corresponding to the target data identification from the database and determining the data as candidate data; and sending the candidate data to the data processing device.

According to one or more embodiments of the present disclosure, the determining a target data identification from data identifications of a database through the Bloom Filter based on the Bloom vector includes:

performing Hash calculation on a first data identification among the data identifications of the database according to a preset Hash function, querying a value of a position corresponding to a Hash calculation result from the Bloom vector according to the Hash calculation result, and determining whether the first data identification is the target data identification according to the value.

One or more embodiments of the present disclosure provide a device for data acquisition, which includes:

an intersection determination, configured to determine a data identification intersection between databases of data providers, where the data identification intersection includes data identifications that are same between the databases of the data providers.

a vector construction unit, configured to construct a Bloom vector of a Bloom Filter according to the data identification intersection.

a sending unit, configured to send the Bloom vector to the data providers.

a receiving unit, configured to receive candidate data sent by the data providers, where the candidate data is data corresponding to a target data identification, and the target data identification is determined by the data providers from data identifications of respective databases through the Bloom Filter based on the Bloom vector.

a data processing unit, configured to select target data corresponding to the data identification intersection from the candidate data.

In one or more embodiments of the present disclosure, when constructing the Bloom vector of the Bloom Filter according to the data identification intersection, the vector construction unit is configured to:

perform Hash calculation on the data identifications in the data identification intersection according to a preset Hash function, and construct the Bloom vector based on a Hash calculation result and a preset Bloom vector length.

In one or more embodiments of the present disclosure, the preset Bloom vector length is a preset multiple of a total number of the data identifications in the data identification intersection, and the preset multiple is less than 1.

In one or more embodiments of the present disclosure, before constructing the Bloom vector based on the Hash calculation result and the preset Bloom vector length, the vector construction unit is further configured to:

determine a total number of the data identifications in the data identification intersection; and determine the preset Bloom vector length based on the total number of the data identifications and an adjustment factor for a misidentification rate of the Bloom Filter.

In one or more embodiments of the present disclosure, when determining the preset Bloom vector length based on the total number of the data identifications and the adjustment factor for the misidentification rate of the Bloom Filter, the vector construction unit is configured to:

determine the total number of the data identifications as an initial Bloom vector length; and reduce the initial Bloom vector length based on the adjustment factor to obtain the preset Bloom vector length.

In one or more embodiments of the present disclosure, after selecting target data corresponding to the data identification intersection from the candidate data, the data processing unit is further configured to:

fuse target data corresponding to the same data identification and conduct data processing based on the fused target data.

In one or more embodiments of the present disclosure, the method is applied to a data processing device in the trusted execution environment (TEE).

One or more embodiments of the present disclosure provide a device for data acquisition, which includes:

a receiving unit, configured to receive a Bloom vector of a Bloom Filter sent by a data processing device, where the Bloom vector of the Bloom Filter is a Bloom vector corresponding to a data identification intersection between databases of data providers.

a filtering unit, configured to determine a target data identification from data identifications of a database through the Bloom Filter based on the Bloom vector.

a data acquisition unit, configured to acquire data corresponding to the target data identification from the database and determining the data as candidate data.

a sending unit, configured to send the candidate data to the data processing device for joint data processing.

In one or more embodiments of the present disclosure, when determining a target data identification from data identifications of the database through the Bloom Filter based on the Bloom vector, the filtering unit is configured to:

perform Hash calculation on a first data identification among the data identifications of the database according to a preset Hash function, query a value of a position corresponding to a Hash calculation result from the Bloom vector according to the Hash calculation result, and determine whether the first data identification is the target data identification according to the value.

One or more embodiments of the present disclosure further provide an electronic device, which includes at least one processor and at least one memory, where the at least one memory stores computer-executable instructions, and the at least one processor executes the computer-executable instructions stored in the at least one memory, causing the at least one processor to implement the method for data acquisition described above.

One or more embodiments of the present disclosure further provide a non-transient computer-readable storage medium, which stores computer-executable instructions, the computer-executable instructions upon being executed by a processor, implementing the method for data acquisition described above.

One or more embodiments of the present disclosure further provide a computer program product which includes computer-executable instructions that, when executed by a processor, implement the method for data acquisition described above.

The foregoing are merely descriptions of the preferred embodiments of the present disclosure and the explanations of the technical principles involved. It will be appreciated by those skilled in the art that the scope of the disclosure involved herein is not limited to the technical solutions formed by a specific combination of the technical features described above, and shall cover other technical solutions formed by any combination of the technical features described above or equivalent features thereof without departing from the concept of the present disclosure. For example, the technical features described above may be mutually replaced with the technical features having similar functions disclosed herein (but not limited thereto) to form new technical solutions.

In addition, while operations have been described in a specific order, it shall not be construed as requiring that such operations are performed in the stated specific order or sequence. Under certain circumstances, multitasking and parallel processing may be advantageous. Similarly, while some specific implementation details are included in the above discussions, these shall not be construed as limitations to the present disclosure. Some features described in the context of a separate embodiment may also be combined in a single embodiment. Rather, various features described in the context of a single embodiment may also be implemented separately or in any appropriate sub-combination in a plurality of embodiments.

Although the present subject matter has been described in a language specific to structural features and/or logical method acts, it will be appreciated that the subject matter defined in the appended claims is not necessarily limited to the specific features and acts described above. Rather, the specific features and acts described above are merely exemplary forms for implementing the claims.

The invention claimed is:

1. A method for data acquisition, comprising:
   determining a data identification intersection between databases of data providers, wherein the data identification intersection comprises data identifications that are same between the databases of the data providers;
   constructing a Bloom vector of a Bloom Filter according to the data identification intersection, and sending the Bloom vector to the data providers;
   receiving candidate data sent by the data providers, wherein the candidate data is data corresponding to a target data identification, and the target data identification is determined by the data providers from data identifications of respective databases through the Bloom Filter based on the Bloom vector; and
   selecting target data corresponding to the data identification intersection from the candidate data,
   wherein the constructing a Bloom vector of a Bloom Filter according to the data identification intersection comprises:
   performing Hash calculation on the data identifications in the data identification intersection according to a Hash function, and constructing the Bloom vector based on a Hash calculation result and a preset Bloom vector length.

2. The method according to claim 1, wherein the preset Bloom vector length is a preset multiple of a total number of the data identifications in the data identification intersection, and the preset multiple is less than 1.

3. The method according to claim 1, before the constructing the Bloom vector based on a Hash calculation result and a preset Bloom vector length, further comprising:
   determining a total number of the data identifications in the data identification intersection; and
   determining the preset Bloom vector length based on the total number of the data identifications and an adjustment factor for a misidentification rate of the Bloom Filter.

4. The method according to claim 3, wherein the determining the preset Bloom vector length based on the total number of the data identifications and an adjustment factor for a misidentification rate of the Bloom Filter comprises:
determining the total number of the data identifications as an initial Bloom vector length; and
reducing the initial Bloom vector length based on the adjustment factor to obtain the preset Bloom vector length.

5. The method according to claim 1, after the selecting target data corresponding to the data identification intersection from the candidate data, further comprising:
fusing target data corresponding to a same data identification and conducting data processing based on fused target data.

6. The method according to claim 1, wherein the method is applied to a data processing device in a trusted execution environment.

7. A method for data acquisition, comprising:
receiving a Bloom vector of a Bloom Filter sent by a data processing device, wherein the Bloom vector of the Bloom Filter is a Bloom vector corresponding to a data identification intersection between databases of data providers;
determining a target data identification from data identifications of a database through the Bloom Filter based on the Bloom vector;
acquiring data corresponding to the target data identification from the database and determining the data as candidate data; and
sending the candidate data to the data processing device,
wherein the determining a target data identification from data identifications of a database through the Bloom Filter based on the Bloom vector comprises:
performing Hash calculation on a first data identification among the data identifications of the database according to a Hash function, querying a value of a position corresponding to a Hash calculation result from the Bloom vector according to the Hash calculation result, and determining whether the first data identification is the target data identification according to the value.

8. An electronic device, comprising:
at least one processor and at least one memory,
wherein the at least one memory stores computer-executable instructions, and the at least one processor executes the computer-executable instructions stored in the at least one memory, causing the at least one processor to implement a method for data acquisition, and the method comprises:
determining a data identification intersection between databases of data providers, wherein the data identification intersection comprises data identifications that are same between the databases of the data providers;
constructing a Bloom vector of a Bloom Filter according to the data identification intersection, and sending the Bloom vector to the data providers;
receiving candidate data sent by the data providers, wherein the candidate data is data corresponding to a target data identification, and the target data identification is determined by the data providers from data identifications of respective databases through the Bloom Filter based on the Bloom vector; and
selecting target data corresponding to the data identification intersection from the candidate data,
wherein the constructing a Bloom vector of a Bloom Filter according to the data identification intersection comprises:
performing Hash calculation on the data identifications in the data identification intersection according to a Hash function, and constructing the Bloom vector based on a Hash calculation result and a preset Bloom vector length.

9. The electronic device according to claim 8, wherein the preset Bloom vector length is a preset multiple of a total number of the data identifications in the data identification intersection, and the preset multiple is less than 1.

10. The electronic device according to claim 9, wherein before the constructing the Bloom vector based on a Hash calculation result and a preset Bloom vector length, the method further comprises:
determining a total number of the data identifications in the data identification intersection; and
determining the preset Bloom vector length based on the total number of the data identifications and an adjustment factor for a misidentification rate of the Bloom Filter.

11. The electronic device according to claim 8, wherein the determining the preset Bloom vector length based on the total number of the data identifications and an adjustment factor for a misidentification rate of the Bloom Filter comprises:
determining the total number of the data identifications as an initial Bloom vector length; and
reducing the initial Bloom vector length based on the adjustment factor to obtain the preset Bloom vector length.

12. The electronic device according to claim 8, wherein after selecting target data corresponding to the data identification intersection from the candidate data, the method further comprises:
fusing target data corresponding to a same data identification and conducting data processing based on fused target data.

13. The electronic device according to claim 8, wherein the method is applied to a data processing device in a trusted execution environment.

14. A non-transient computer-readable storage medium, storing computer-executable instructions, wherein the computer-executable instructions upon being executed by a processor, implement the method for data acquisition according to claim 1.

* * * * *